United States Patent

Stark

Patent Number: 5,150,728
Date of Patent: Sep. 29, 1992

[54] UMBRELLA WITH MAGNETIC FASTENERS

[76] Inventor: Catherine Stark, 431 Lake Helen Dr., West Palm Beach, Fla. 33411

[21] Appl. No.: 748,743

[22] Filed: Aug. 20, 1991

[51] Int. Cl.⁵ .............................................. A45B 3/00
[52] U.S. Cl. .................................. 135/16; 135/33.2; 40/600
[58] Field of Search ................ 135/16, 15.1, 33.2, 135/119, 88; 40/600

[56] References Cited

U.S. PATENT DOCUMENTS

| | | | |
|---|---|---|---|
| 2,319,292 | 5/1943 | Boggs | 135/119 X |
| 3,151,621 | 10/1964 | Jackson | 135/16 X |
| 4,738,274 | 4/1988 | Heath | 135/88 |
| 4,756,325 | 7/1988 | Daniels | 135/88 |
| 4,805,654 | 2/1989 | Wang | 135/98 X |
| 4,856,546 | 8/1989 | Kummunsals | 135/15.1 |
| 4,876,812 | 10/1989 | Haralson | 40/600 |
| 5,046,446 | 9/1991 | Sumrall et al. | |

Primary Examiner—Richard E. Chilcot, Jr.
Assistant Examiner—Lan Mai
Attorney, Agent, or Firm—Malin, Haley, McHale, DiMaggio & Crosby

[57] ABSTRACT

An umbrella having one or more magnetic fasteners attached thereto strategically located to provide support of an open umbrella to a metallic surface on a vehicle so that the umbrella can be self-supported adjacent the opening of a vehicle such as the door opening or trunk and would withstand and be supported on the surface in rains or wind. The device permits the user to have both hands free for removing or placing small children or articles in a vehicle.

2 Claims, 1 Drawing Sheet

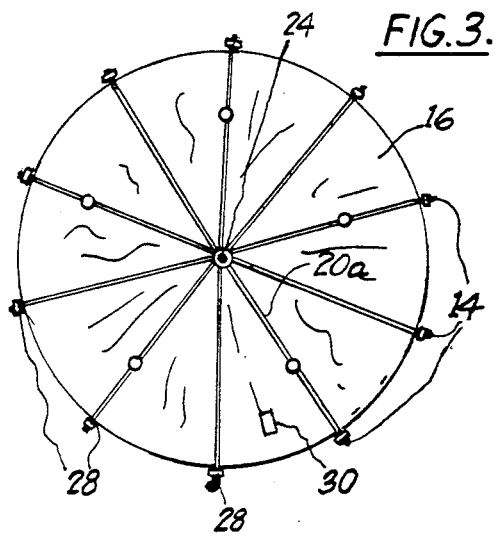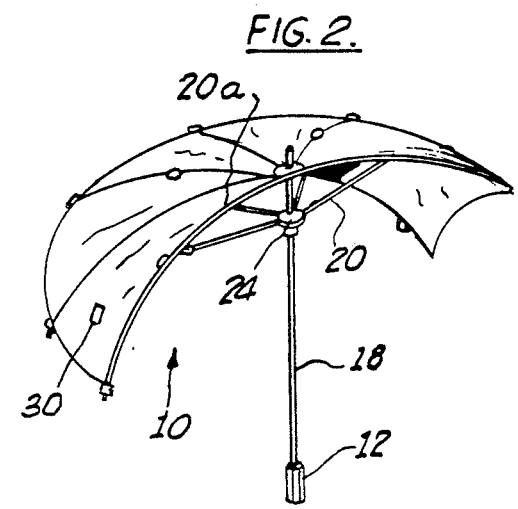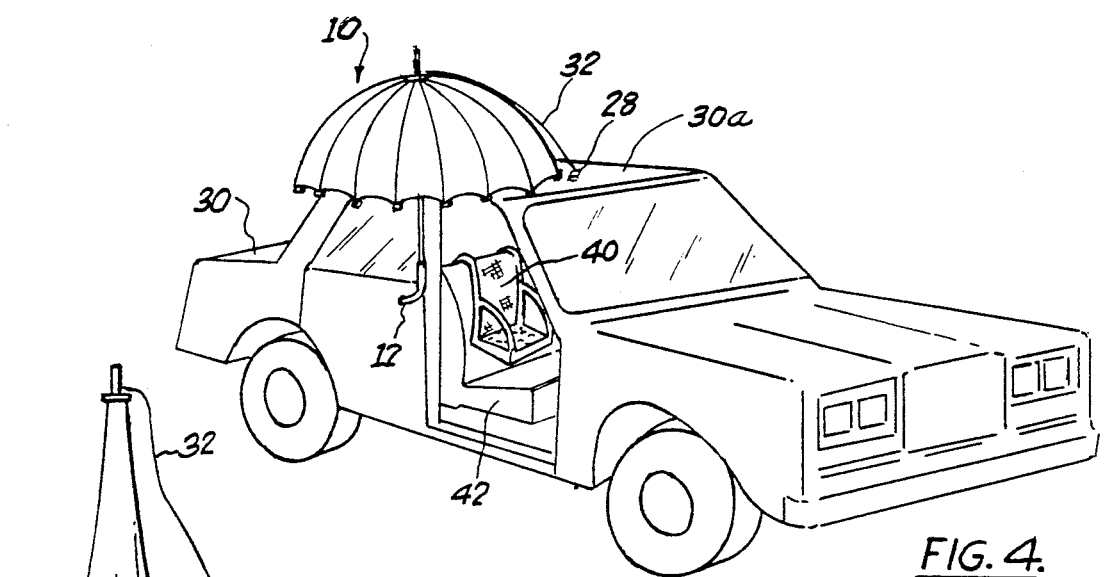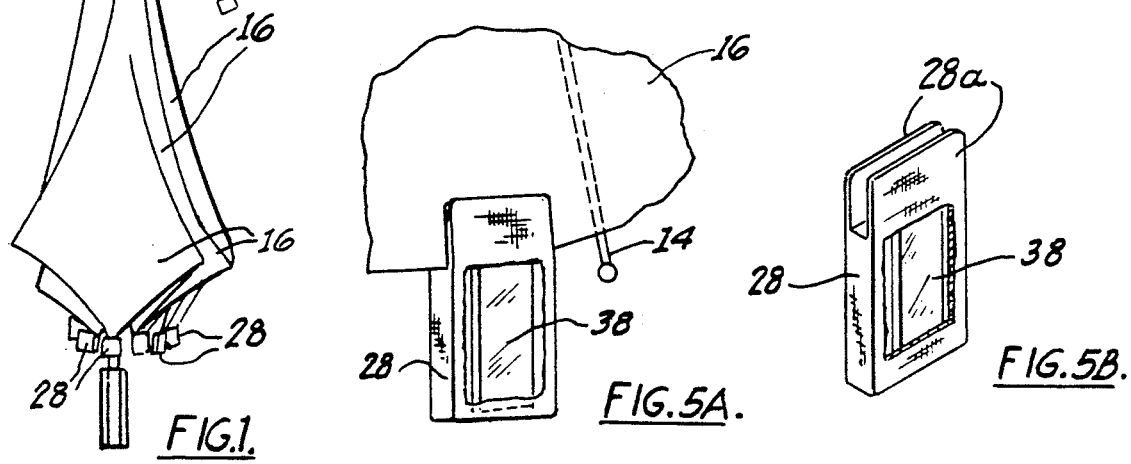

UMBRELLA WITH MAGNETIC FASTENERS

BACKGROUND OF THE INVENTION

1. Field of the Invention

This invention relates to an umbrella having magnetic fasteners such that the umbrella can be removably fastened to a metallic surface such as found in an automobile roof, door or trunk area to allow the user to place or remove children or articles from the vehicle with both hands while the umbrella is mounted to the vehicle in such a way as to provide protection from the rain for the user.

2. Description of the Prior Art

Conventional hand-held collapsible umbrellas have been utilized for many years to protect one from the rain. One major situation, however, presents a drawback to the use of the hand-held umbrella and that is the removal or insertion of articles or children into and from a vehicle in the pouring rain. Trying to support the umbrella with one hand and to remove a bag of groceries or a small child from a car seat with the other hand can be very tricky, if not at times impossible. Typically, both hands must be used for the task which means that the umbrella can no longer be supported properly and the user and the articles and children often get wet.

The present invention overcomes this problem by providing a hand-held umbrella that includes magnetic fasteners which readily and reliably attach to a metallic surface such as the roof of an automobile, car door or the trunk of an automobile. Using the present invention, the umbrella can be quickly attached or removed from the vehicle surface in the area, adjacent the opening of the vehicle such as the door opening or the trunk opening such that both hands of the user are then free to grasp articles or children for insertion or removal from the vehicle.

SUMMARY OF THE INVENTION

A collapsible hand-held umbrella that includes at least one magnetic fastener comprising a conventional umbrella having a plurality of collapsible hinged ribs, radially attached together about a vertical supporting shaft, a water resistant fabric canopy mounted to the collapsible ribs, and one or more magnets attached preferably to the canopy or to the ribs in strategic locations which allow for convenient, adequate attachment magnetically to a vehicle metal surface.

In one embodiment, the magnetic fasteners can be small metal or ferromagnetic magnets one, two, three inches in length and one inch wide and a half-inch thick placed in a fabric pouch that is sewn to the fabric canopy or to the rim of the canopy at selected locations. For example, two of such fabric pouches each containing a magnet can be attached along one portion of the rim of the canopy with a third magnet and pouch sewn on the canopy approximately half way up the canopy. Thus, three separate magnets will readily attach to the roof and door area of the metallic vehicle or to the trunk area and allow it to be positioned as desired to protect the user.

The magnets themselves will in no way affect the opening or collapsing of the umbrella which functions in a conventional manner with the ribs and center vertical shaft which typically has a sleeve disposed about that attaches to the ribs and allows the sleeve to move vertically up and down the shaft to open and close the umbrella.

In an alternate embodiment, the device may also include a tethered magnet, preferably disposed from the tip of the canopy on the exterior side, of a predetermined length that has a magnet secured in a fabric pouch under the tether to allow the umbrella to be secured from a tethered position which can be used in addition to the other magnets previously discussed. This will clearly anchor the magnet and the umbrella to the vehicle surface. In the closed position, the tethered magnet could be such a length that it could be magnetically attached to one of the other magnets fastened to the canopy so that they would be held magnetically together when the tethered portion is not in use.

It is an object of this invention to provide an approved hand-held collapsible umbrella that can be utilized effectively for article or personnel installation or removal from a metallic vehicle.

It is another object of this invention to provide an umbrella that can be fastened to a metallic portion of a vehicle adjacent a vehicle opening to permit the user to access a vehicle opening in rain without having to manually support the umbrella adjacent the vehicle opening.

And yet another object of this invention is to provide an umbrella that can be quickly attached or removed from a metallic surface such as that found in vehicles.

In accordance with these and other objects which will be apparent hereinafter, the instant invention will now be described with particular reference to the accompanying drawings.

BRIEF DESCRIPTION OF THE DRAWINGS

FIG. 1 shows, a front elevational view of a collapsed hand-held umbrella in accordance with the present invention.

FIG. 2 shows a perspective view partially cut away of the present invention.

FIG. 3 shows a bottom plan view of the present invention.

FIG. 4 shows an illustration of the present invention in the perspective view as it would be used with a vehicle, with the vehicle door removed for clarity.

FIG. 5A shows a cut away close-up view of a magnetic fastener used with the present invention.

FIG. 5B shows a magnetic fastener in perspective as used with the present invention.

PREFERRED EMBODIMENT OF THE INVENTION

Referring now to the drawings and in particular, FIG. 1, the present invention shown generally at 10 is comprised of a water resistant or waterproof fabric canopy 16 that attaches rib ends 14 to a plurality of interior ribs and a central shaft. The central shaft terminates in a handle 12 which is used to support the umbrella. Attached to the canopy perimeter is a plurality of magnet holders 28 which house small individual magnets and which are described in greater detail below.

In an alternate embodiment, an additional magnetic fastener 34 may be tethered by a cord 32 to the center of the canopy 28. As shown in FIG. 1, the umbrella is in a collapsed position and the magnet holders 28 are disposed on the outside surface of fabric canopy 16.

Referring now to FIG. 2, the present invention is shown which includes a rigid collapsible (telescopic)

vertical shaft 18 Q connected to handle 12 terminating in canopy center 24. Major metal ribs 20 and support ribs 20a support the canopy in an open position to maintain the canopy 16 (a water resistant fabric preferably) in a substantially hemi-spherical shape over each of the rib members 20, all of which is done in a conventional manner. The specific construction of the umbrella along is not critical to this invention provided that it is handheld and is preferably collapsible. What is important as shown in FIG. 2 is the plurality of magnet holders 28, that is a small fabric pocket that contains one small magnet which is in this particular embodiment sewn to the outside surface canopy 16. Each of the magnet holders 28 will readily attach to a metal surface that can be magnetized by virtue of the magnet inside the holder 28. Such surfaces are found in conventional automobiles and trucks of sheet metal which are subject to magnetic forces so that the magnet holders 28 are attachable to a metal car body by magnetic force. Note also in FIG. 2 that in an alternate embodiment of the invention, a string or cord attached at one end to the center of the umbrella forming tether 32 cf indeterminate length could include an additional magnet holder 34 attached at its free end which also could be attached by a magnetic force to a metallic magnetic surface. The tether 32 will allow the umbrella to be supported in various positions about the surface for example, of a metal automobile vehicle, in addition to the other magnets in the magnet holders 28 for additional stability, especially in heavy rains or high winds.

FIG. 3 shows the disposition of three magnet holders 28 attached about the perimeter of canopy 16 from the inside view. Elements 20b represent conventional hinge joints that pivotally attach collapsibly rigid ribs 20 to additional rib braces 20a, all of which is conventional in collapsible umbrellas.

FIG. 4 shows one disposition of the invention 10 as it might be employed or attached to the roof 30a of an automobile adjacent the front door opening of an automobile 30a. In this position the automobile is not shown for clarity. The umbrella 10 will prevent rain from being received on a person standing at the door opening for loading or unloading groceries or small children from a child's restraint seat 40 secured to care seat 42.

FIGS. 5a and 5b shows a magnet or ferro-magnet 38 which is a small metal bar of a magnetized material, the bar having a north and south pole and encapsulated in a fabric pouch 28 which could be made of the same material as the umbrella and which is sewn to the canopy by a pair of flaps 28a which extend from one end of the magnet fabric pouch 28. The fabric pouch will not interfere with the magnetic lines of force from a magnet 38 in the holder 28 to an outside metal, magnetic surface. With this attachment, magnet holders 28 can be positioned when the umbrella holders 28 are added at the factory to one or more locations around the periphery of the umbrella. The fabric flaps 28a can also be both jointly sewn on one side of the canopy away from the perimeter or rim of the canopy such as shown in FIG. 2 so that multiple magnet holders 28 each containing a magnet are employed. There may be other ways to attach magnets to the umbrella either on canopy, the ribs or even on the main support shaft. In addition, one or more tethered magnets could be attached as described in FIG. 2 for additional attachment support that can be more advantageously positioned on the vehicle for improved support.

One of the advantages of having the magnets in a fabric pouch 28 as shown in FIGS. 5A and 5B is that the metal material of the magnet 38 will not directly contact the painted metal surface of the automobile thus preventing scratches or other damage to the painted automobile surface.

The strength of the magnets 38 and the number of magnets employed are such that a conventional handheld lightweight umbrella can be firmly held in place against the car body surface while at the same time not materially increasing the overall weight of the umbrella and not making disengagement of the umbrella from the metal surface unreasonably forceful for a normal person of normal strength. The size of the magnets can vary also but could typically be one to two inches long and one half to one inch in width and thickness.

The instant invention has been shown and described herein in what is considered to be the most practical and preferred embodiment. It is recognized, however, that departures may be made therefrom within the scope of the invention and that obvious modifications will occur to a person skilled in the art

What I claim is:

1. An umbrella that can be readily attached to a metallic magnetic surface such as found in an automobile comprising:

a fabric canopy;

a plurality of radially disposed supporting ribs attached to one side of said canopy;

a shaft operably connected to said radial ribs for moving said ribs from a first position to a second position causing the canopy to move from an open position to a closed position; and magnetic fastening means strategically attached to at least one location on said umbrella for attachment to a metal magnetic surface, said magnetic fastening means includes a plurality of fabric pocket attached to said canopy, the plurality of magnetic fasteners strategically disposed and fastened in fabric pockets to said canopy;

wherein said umbrella is supported and held in place about the metal magnetic surface without being hand held by the user thus allowing the user to perform other functions while retaining the benefits of said umbrella.

2. A device as in claim 1, including:

a tether attached to said umbrella, and a magnet attached to the free end of said tether whereby said tethered magnet may be used as additional support for said canopy on a metal magnetic surface.

* * * * *